United States Patent
Mattisson et al.

(10) Patent No.: US 6,975,667 B2
(45) Date of Patent: Dec. 13, 2005

(54) DUAL-RADIO COMMUNICATION APPARATUS, AND AN OPERATING METHOD THEREOF

(75) Inventors: Sven Mattisson, Bjärred (SE); Jacobus Haartsen, Hardenberg (NL); Robert Bristow, Basingstoke Hants (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 883 days.

(21) Appl. No.: 09/859,704

(22) Filed: May 17, 2001

(65) Prior Publication Data

US 2002/0012381 A1 Jan. 31, 2002

(30) Foreign Application Priority Data

May 18, 2000 (SE) .................... 0001821

(51) Int. Cl.[7] .............. H04B 1/69; H04B 1/713
(52) U.S. Cl. ............... 375/132; 455/551; 455/552.1
(58) Field of Search ................. 375/130, 132; 370/336, 347; 455/552.1, 553.1

(56) References Cited

U.S. PATENT DOCUMENTS

| | | | |
|---|---|---|---|
| 4,435,821 A * | 3/1984 | Ito et al. ................ | 375/137 |
| 5,596,330 A * | 1/1997 | Yokev et al. ............ | 342/387 |
| 5,696,903 A | 12/1997 | Mahany ................ | 395/200.58 |
| 5,796,772 A * | 8/1998 | Smith et al. ............ | 375/130 |
| 2002/0001337 A1 * | 1/2002 | Chauncey et al. ........ | 375/132 |

FOREIGN PATENT DOCUMENTS

| GB | 2 329 303 A | 3/1999 | |
|---|---|---|---|
| GB | 2329303 | * 3/1999 | ............ H04Q 7/32 |

OTHER PUBLICATIONS

EDN, vol. 45, No. 9, Apr. 27, 2000, Sami Haapoja, "Digital convergence is coming: Are mobile-phone RF parts ready?", pp. 125, 126, 128 and 130. (English).
International-Type Search Report prepared by the ISA/SE in connection with SE 0001821-8 as filed on May 18, 2000. (English).

* cited by examiner

*Primary Examiner*—Jay K. Patel
*Assistant Examiner*—Qutub Ghulamali

(57) ABSTRACT

A dual-radio communication apparatus has a first radio device, such as a Bluetooth radio, for use in a first frequency band, and a second radio device, such as a Globalstar satellite radio, for use in a second frequency band, which is proximate to the first frequency band. The communication apparatus also has a controller coupled to the first and second radio devices. The first radio device may comprise a frequency-hopping spread-spectrum transmitter. Moreover, the first radio device has a first operating mode employing a first frequency range. The first radio device also has a second operating mode employing a second frequency range, which is smaller than the first frequency range. The controller is adapted to set the first radio device in its second operating mode, when the second radio device is in operation, and otherwise set the first radio device in its first operating mode.

8 Claims, 5 Drawing Sheets

DUAL-RADIO COMMUNICATION APPARATUS, AND AN OPERATING METHOD THEREOF

TECHNICAL FIELD

The present invention relates to a dual-radio communication apparatus of the type having a first radio device for use in a first frequency band, a second radio device for use in a second frequency band, proximate to the first frequency band, and a controller coupled to the first and second radio devices. The invention also relates to a method of operating such a dual-radio communication apparatus.

DESCRIPTION OF THE PRIOR ART

One example of a dual-radio communication apparatus according to the above is a mobile telephone having a first radio device in the form of a GSM or D-AMPS cellular radio transmitter/receiver, and a second radio device in the form of an auxiliary short-range radio for wireless connection of external devices, such as peripherals, to the mobile telephone.

GSM or D-AMPS radio transmitters/receivers (or any other radio devices used in mobile terminals for cellular telecommunications) are believed to be well known in all essential aspects to everyone skilled in the technical field, and consequently such radio devices need no further explanation herein.

One recently introduced type of short-range auxiliary radio devices is Bluetooth. Bluetooth is intended to provide flexible and transparent connectivity between portable devices, such as mobile telephones, laptop computers, personal digital assistants (PDA) and various peripherals for these devices. Bluetooth operates within an unlicensed frequency band at 2.45 GHz, generally known as ISM (Industrial, Scientific and Medical), which is globally available. The ISM band provides 83.5 MHz of radio spectrum. To allow different radio networks to share the same radio medium without coordination or supervision, signal spreading is usually applied. Some governmental authorities such as the FCC in the United States, currently require radio equipment operating in the 2.45 GHz band to apply some form of signal spreading, when the transmit power exceeds 0 dBm. Signal spreading can either be performed at a symbol level by direct-sequence (DS) spread-spectrum, or at a channel level by frequency-hopping (FH) spread-spectrum. The latter approach is attractive, since it allows the use of cost-effective radios, and better deals with near-far problems.

Bluetooth supports both data and voice communication. Voice communication is optimized by applying fast frequency hopping with a nominal rate of 800 hop/s through the entire 2.45 GHz ISM band in combination with a robust voice coding. Devices based on Bluetooth can create so-called piconets, consisting of a master device (such as a mobile telephone) and one or more slave devices (such as peripherals for the mobile telephone), which are connected to the master device via a frequency-hopping piconet channel. The frequency-hopping sequence used for the piconet channel will be completely determined by the address or identity of the master device. The system clock of the master device determines the phase of the hopping sequence. In Bluetooth, each device is provided with a free-running system clock. The slave devices add a time offset to their clocks, so that the clocks align with the clock of the master device. By using the master address to select the proper hopping sequence and using the time offset to align with the master clock, the slave devices maintain in hop synchronism with the master device. The master device and the slave devices will remain in contact by hopping synchronously to the same hop carrier frequency.

When a mobile telephone is provided with an integrated Bluetooth radio device, the mobile telephone will be able to provide both a wide area wireless interface to the mobile telecommunications network via the cellular radio (GSM, D-AMPS, etc.) and a local area wireless interface to available slave devices via the Bluetooth radio device. Combining multiple radios in a single apparatus presents several challenges in the area of electromagnetic compatibility. It is more or less impossible to fully prevent interference between radio devices, that are arranged close to each other (i.e. integrated into the same apparatus, such as a mobile telephone). However, if the frequency ranges used by the two radio devices are sufficiently separated, mutual interference may be sufficiently suppressed by appropriate filtering. Therefore, a Bluetooth radio device operating between 2400 and 2483.5 MHz and a GSM radio receiver operating between 935 and 960 MHz may operate simultaneously without any considerable interference, provided that appropriate filtering is applied at the front ends of the receivers of the radio devices.

Moreover, if both radio devices make use of a packet or burst-based principle, such as a slot-based Bluetooth system and a TDMA-based cellular system, interference may be avoided by proper scheduling of the packet transmissions.

There are, on the other hand, other wireless systems using a radio band, which is neither sufficiently separated from the Bluetooth frequency band nor is slot-based. An important example is the Globalstar system used for satellite communications. The Globalstar system uses direct-sequence spread-spectrum in a radio band, which is just above the 2.45 GHz ISM band used by Bluetooth. In more detail, the downlink channel of a Globalstar system uses a frequency band between 2483.5 and 2500 MHz. Therefore, integrating a Bluetooth radio into a Globalstar satellite terminal will be a problem because of the interference generated by Bluetooth into the Globalstar downlink channel. Although, the Bluetooth radio device will only use frequency hop channels up to 2480 MHz, the distance of only 3.5 MHz to the beginning of the downlink channel band will be insufficient to adequately suppress spurious effects caused by the Bluetooth transmitter.

One solution to this problem is to provide steep and expensive filters in the Globalstar radio device. Another solution would be to provide a large physical distance between the Bluetooth and Globalstar radio devices. A third solution involves prohibiting the Bluetooth radio from being used when the Globalstar radio is operating. Obviously, all of these solutions have severe drawbacks.

SUMMARY

It is an object of the present invention to provide a better solution to the above problem.

According to a preferred embodiment of the invention, in a dual-radio communication apparatus having a Bluetooth radio as a first radio device and a Globalstar satellite radio as a second radio device, a controller of the apparatus is arranged to run the Bluetooth radio in either a first operating mode or a second operating mode, depending on whether or not the Globalstar satellite radio is in operation. During times when the Globalstar satellite radio is not in operation, the Bluetooth radio will be maintained in its first operating mode, where frequency-hopping will take place in the entire Bluetooth frequency range. On the other hand, during times when the Globalstar radio is currently in operation, the frequency-hopping of the Bluetooth radio will be limited to only a part of the Bluetooth frequency band, viz. a part which provides maximum spectral separation from the receive band of the Globalstar satellite radio. Consequently, sufficient guardspace is provided in order to suppress any spurious effects caused by the Bluetooth transmitter to an acceptable level.

If the Globalstar satellite radio starts to operate, while the Bluetooth radio is currently maintaining an existing Bluetooth link to an external Bluetooth apparatus, the Bluetooth radios of the two apparatuses will negotiate to switch the Bluetooth link to its second operating mode as described above, wherein the limited hop frequency range will be used. Conversely, when a Bluetooth link is to be established, while the Globalstar satellite radio is already in operation, the Bluetooth link will be initialized in the first operating mode, possibly causing temporary interference with the Globalstar satellite radio receiver. However, the negotiations will immediately take place in order to set the Bluetooth link in its second operating mode, using only the limited hop frequency range. As soon as the Globalstar satellite radio stops operating, the Bluetooth link will be reset to its first operating mode, using again the entire Bluetooth frequency range.

Other objects, features and advantages of the present invention will appear from the following detailed disclosure of a preferred embodiment, from the drawings as well as from the appended claims.

DESCRIPTION OF THE DRAWINGS

A preferred embodiment of the present invention will now be described in more detail with reference to the attached drawings, in which.

DETAILED DISCLOSURE OF A PREFERRED EMBODIMENT

Figure 1:
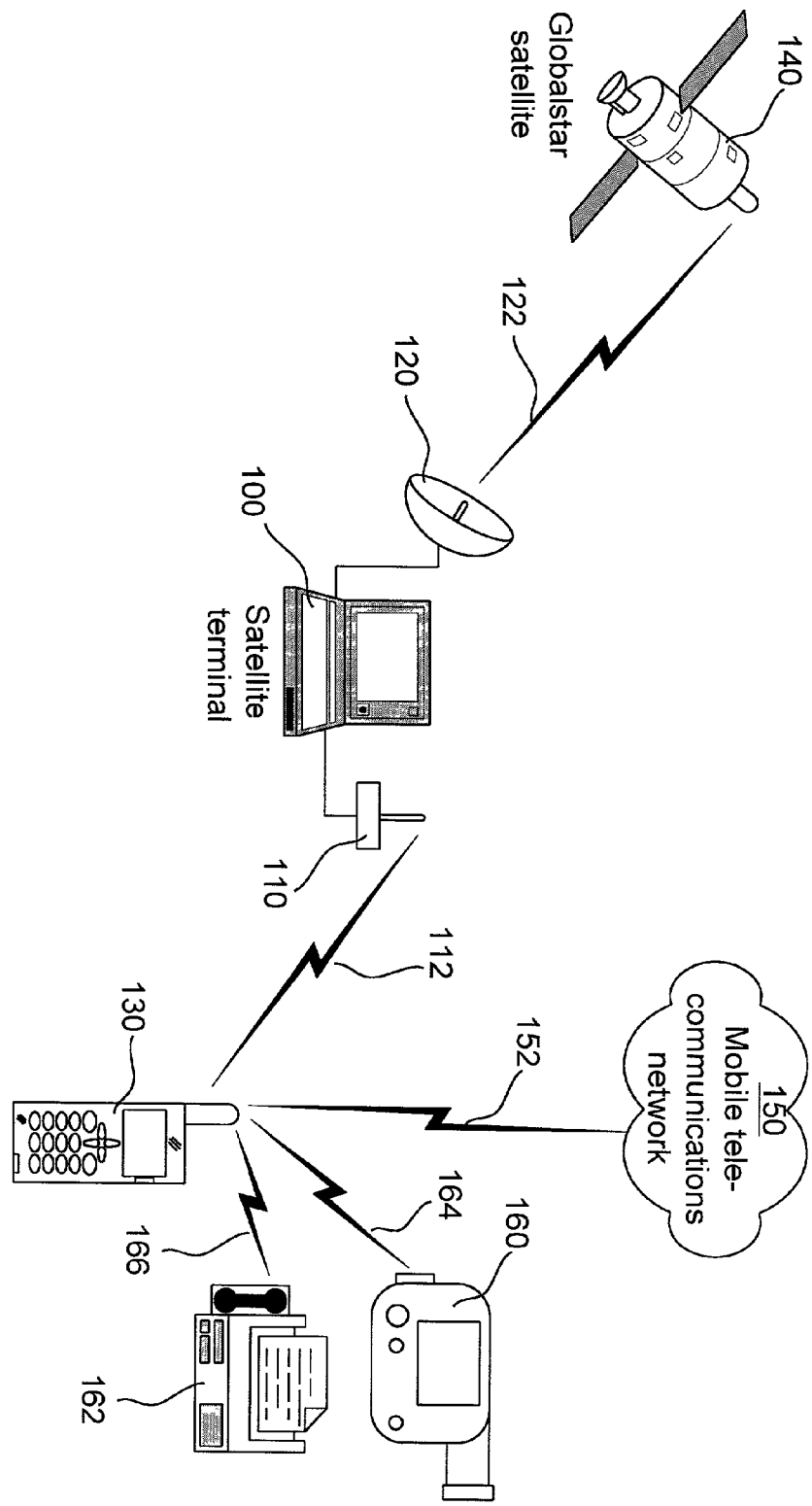
FIG. 1 is a schematic overview of a user case involving a dual-radio communication apparatus connected both through a Bluetooth link to an external apparatus and through a Globalstar satellite link to a Globalstar satellite.

A preferred embodiment of the dual-band communication apparatus according to the present invention is illustrated in FIG. 1 in the form of a Globalstar satellite terminal 100, which has a first radio device 110 for connecting the satellite terminal 100 via a first radio link 112 to a mobile telephone 130. The satellite terminal 100 also has a second radio device 120 for connecting the terminal 100 to a Globalstar satellite 140, which is assumed to travel in a low earth orbit (LEO) around the Earth. The mobile telephone 130 is used as a handset for performing voice communication through the satellite terminal 100 and the Globalstar satellite 140. Satellite-based communication systems for wireless voice communication are generally known in the technical field and are not described in further detail herein.

The wireless link 112 between the satellite terminal 100 and the mobile telephone 130, acting as a handset for the satellite terminal, is a Bluetooth link, which operates in the 2.45 GHz ISM band, as described above. To this end, the satellite terminal 100 comprises a Bluetooth radio transmitter/receiver 110, which is adapted to establish and maintain the Bluetooth link 112 to the mobile telephone 130, which also comprises a Bluetooth radio transmitter-receiver. The mobile telephone 130 is in itself a generally known cellular telephone, such as a GSM or D-AMPS telephone, having Bluetooth functionality. Therefore, the mobile telephone 130 may also be used for conventional mobile communication with a mobile telecommunications network 150 across a wireless GSM or D-AMPS radio link 152, which preferably operates at 900 MHz and/or 1800 MHz. Additionally, the Bluetooth radio transmitter/receiver of the mobile telephone 130 may also be used for connecting the mobile telephone 130 to other external apparatuses, such as telephone peripherals, in a generally known way. In FIG. 1 the mobile telephone 130 is illustrated as being connected to a digital camera 160 through a first Bluetooth link 164 and to a printer/facsimile/copying machine 162 through a second Bluetooth link 166. However, the mobile telephone 130 and the various different apparatuses that may be connected to it form no part of the invention and are not referred to in more detail herein.

As an alternative to the above, the mobile telephone 130 may be replaced by a dedicated handset, which contains a Bluetooth radio transmitter/receiver for connecting to the first radio device 110 of the satellite terminal 100 across the Bluetooth link 112, in a way which is essential identical to what has been described above with reference to the mobile telephone 130. If the device illustrated as 130 in FIG. 1 is implemented as a dedicated handset for the satellite terminal 100, then obviously such a handset 130 will not have any capabilities of connecting to the mobile telecommunications network 150, since the radio link 152 is not supported.

Referring back to the satellite terminal 100, the second radio device 120 thereof is a Globalstar satellite radio transmitter/receiver, which is capable of connecting the satellite terminal 100 to the Globalstar satellite 140. The satellite link 122 operates in a frequency band, which is just above the aforesaid 2.45 GHz ISM band used for Bluetooth; in fact, the receive (Rx) band of the Globalstar system ranges from 2483.5 MHz to 2500 MHz, as is illustrated in more detail in FIG. 3.

Referring again to FIG. 3, it is also illustrated that the ISM frequency band used by the Bluetooth radio 110 is very proximate to the Globalstar receive band. The ISM band is nowadays globally available, and there is no requirement of a license in order to make use of the frequency band. However, governmental authorities, such as the FCC in the United States, have established certain rules so as to allow every present radio unit a fair chance of using the ISM band. These rules prescribe signal spreading, if the transmit power exceeds a certain threshold. For frequency hop spreading, the FCC requires that the radio uses at least 75 frequency hop channels. Each frequency hop channel has a 1 MHz bandwidth in Bluetooth; therefore any Bluetooth radio, including the first radio device 110 of the satellite terminal 100 in FIG. 1, uses at least 75 MHz of frequency spectrum.

Figure 3:
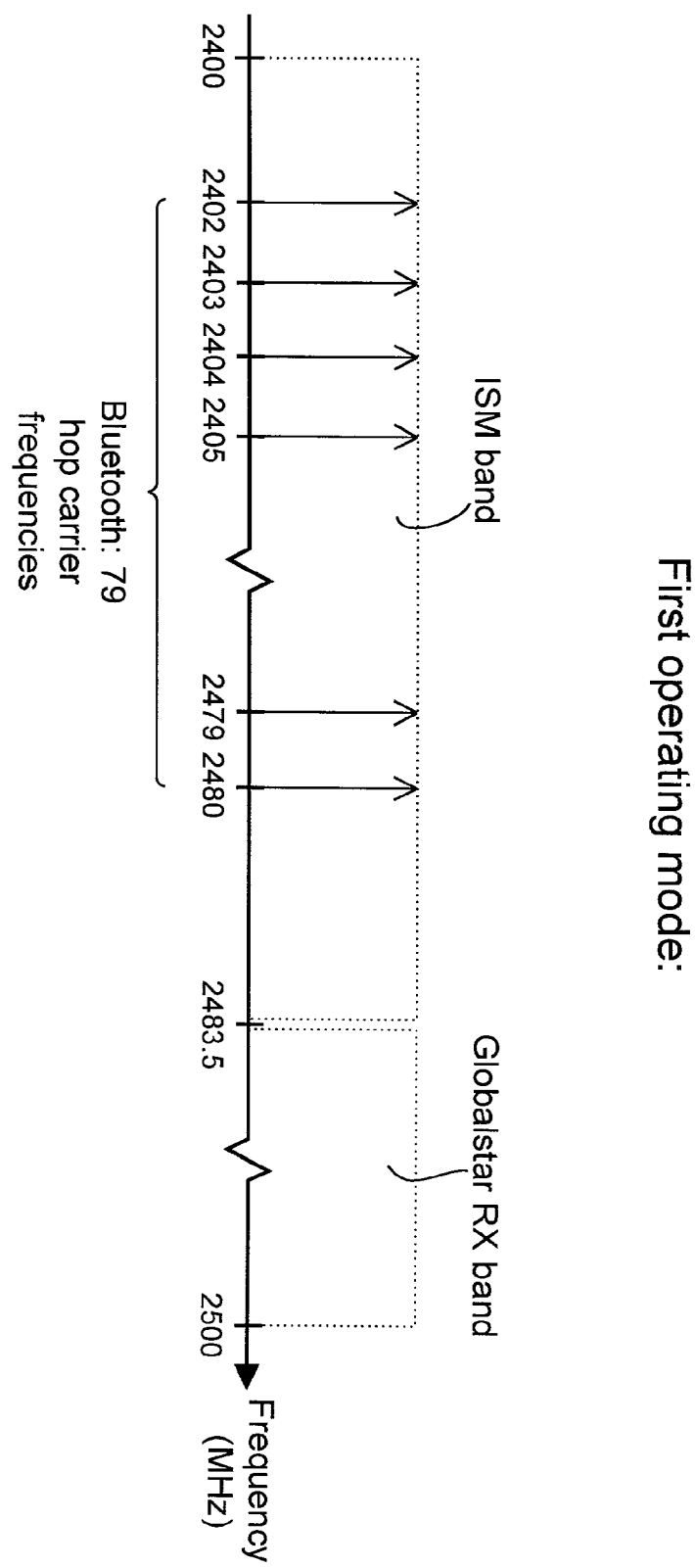
FIG. 3 is a frequency diagram illustrating the frequency band used by the Globalstar satellite radio receiver as well as the frequency band used by the Bluetooth radio device in its first operating mode.

According to the WLAN system 802.11 standard, Bluetooth uses 79 hop carrier frequencies in the 2.45 MHz ISM band, as is illustrated in FIG. 3. The first hop carrier frequency is defined at 2402 MHz, whereas the last hop carrier frequencies resides at 2480 MHz. Therefore, since the entire ISM band ranges from 2400 MHz to 2483 MHz, there is some guardspace available at the lower and upper ends of the ISM band, which facilitates suppression of spurious effects.

Normally, the requirements above are sufficient to prevent interference with external radio systems operating even close to the ISM band. However, for the situation illustrated in FIG. 1, where the satellite terminal 100 comprises first and second radio devices 110, 120, which operate in very close proximity of each other, a more difficult situation occurs. As appears from FIG. 3, there is only 3.5 mHz of guard space between the last hop carrier frequency of the Bluetooth radio 110, i.e. 2480 MHz, and the start of the Globalstar receive band, i.e. at 2483.5 MHz. Therefore, had the solution according to the present invention not been available, spurious effects would have been generated by the Bluetooth radio 110, whenever hop carrier frequencies were used in the uppermost portion of the ISM band. Such spurious effects would have fallen into the Globalstar receive band. The fact that very low power levels are experienced in the signals received across the satellite link 122 by the receiver of the satellite radio device 120 makes this problem even more pronounced.

Figure 2:
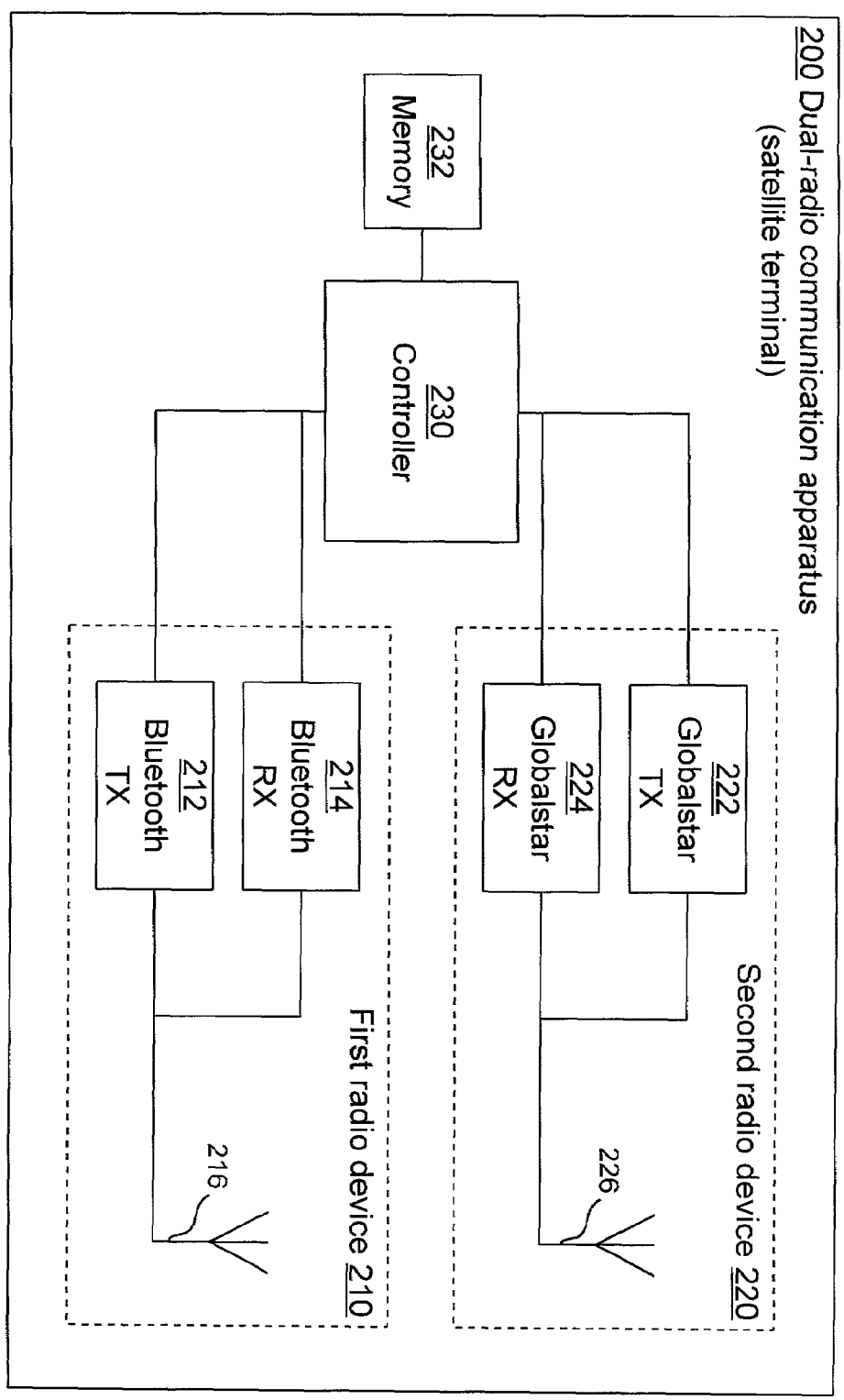
FIG. 2 is a schematic block diagram of a dual-radio communication apparatus according to the preferred embodiment.

Therefore, according to the invention the dual-radio communication apparatus 100 (the satellite terminal in the preferred embodiment illustrated in FIG. 1) is provided with first and second operating modes, which are administered and controlled by a controller 230 of the dual-radio communication apparatus 200 shown in FIG. 2. In FIG. 2, which provides a schematic illustration of the most important components of the satellite terminal 100, 110 and 120 of FIG. 1, there is illustrated a Bluetooth radio device 210, which represents the first radio device 110 (Bluetooth radio) in FIG. 1. The Bluetooth radio device 210 comprises a Bluetooth transmitter 212 and a Bluetooth receiver 214, both of which are connected to an antenna 216. The Bluetooth transmitter and receiver 212, 214 are also coupled to the controller 230.

Moreover, the dual-radio communication apparatus 200 also comprises a Globalstar radio device 220, which corresponds to the second radio device 120 (Globalstar radio) of the satellite terminal 100 shown in FIG. 1. The Globalstar radio device 220 comprises a Globalstar transmitter 222 and a Globalstar receiver 224, both of which are coupled to an antenna 226 and are also connected to the controller 230. The controller 230 may be implemented in several different ways, such as in the form of a programmable microprocessor (CPU), an Application-Specific Integrated Circuit (ASIC), or any other electronic logic device that fulfills the functional requirements set out below. Portions of the controller 230 may also be implemented in the form of software program instructions, which are stored in an electronic memory 232 and may be read and executed by the controller 230. The memory 232 is coupled to the controller 230 and may be implemented e.g. as a RAM memory, ROM memory, EEPROM memory, flash memory, etc. The entire controller 230 and/or its memory 232, or certain portions thereof, may alternatively be integrated with the Bluetooth radio device 210 and/or the Globalstar radio device 220.

Figure 4:
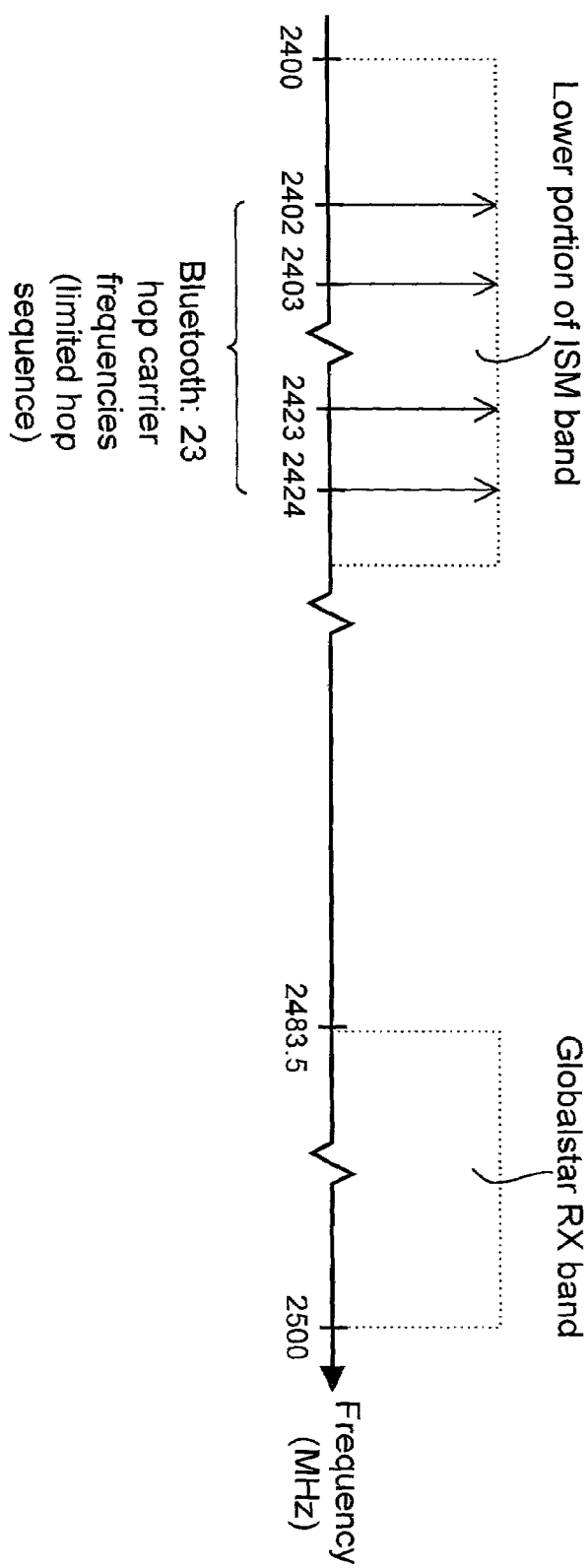
FIG. 4 is a frequency diagram illustrating the frequency band used by the Globalstar satellite radio receiver as well as the frequency band used by the Bluetooth radio device in its second operating mode.

In the first operating mode, the dual-radio communication apparatus 100, 200 of the preferred embodiment uses 79 hop carrier frequencies, which according to FIG. 3 occupy essentially the entire ISM band or more particularly between 2402 MHz and 2480 MHz. In its second operating mode, on the other hand, the communication apparatus 100, 200 will only use 23 hop carrier frequencies, which are all located in the lowermost portion of the ISM band, as illustrated in FIG. 4. As shown in FIG. 4, the last hop carrier frequency of these 23 frequencies is located at 2424 MHz, giving a considerably extended spectral distance to the beginning of the Globalstar receive band. More specifically, this distance has been extended to more than 59 MHz as compared to merely about 3.5 MHz in the first operating mode.

Due to governmental regulations, the dual-radio communication apparatus 100, 200 may be adapted to limit its transmits power when used in the second operating mode. The reason for this may be current FCC requirements, stating that whenever the transmit power exceeds 0 dBm, frequency-hopping spread-spectrum operations in the ISM band must use at least 75 hop carrier frequencies. However, even if the transmit power is restricted in this way in the second operating mode, the short-range Bluetooth applications will still be sufficiently supported. Additionally, the operating range in the second operating mode may be further increased by improving the receiver sensitivity in the Bluetooth radio.

Normally, the communication apparatus 100, 200 will operate in its first operating mode, using the full 79-hop sequence. The second operating mode will only be used, when the Globalstar radio device 120, 220 is in operation. When the Globalstar link 122 is subsequently released, the Bluetooth radio device 110, 210 will preferably re-enter the first operating mode so as to obtain as much interference immunity as possible. If a Globalstar link is established, while a Bluetooth link is currently maintained in the first operating mode, the Globalstar radio device 120, 220 will send a control signal to the controller 230. Upon reception of such a control signal from the Globalstar radio 120, 220, the controller 230 will command the Bluetooth radio device 110, 210 to start negotiating with the Bluetooth radio transmitter/receiver at the other side (i.e. at the mobile telephone or handset 130 in FIG. 1) about entering the second operating mode.

Figure 5:
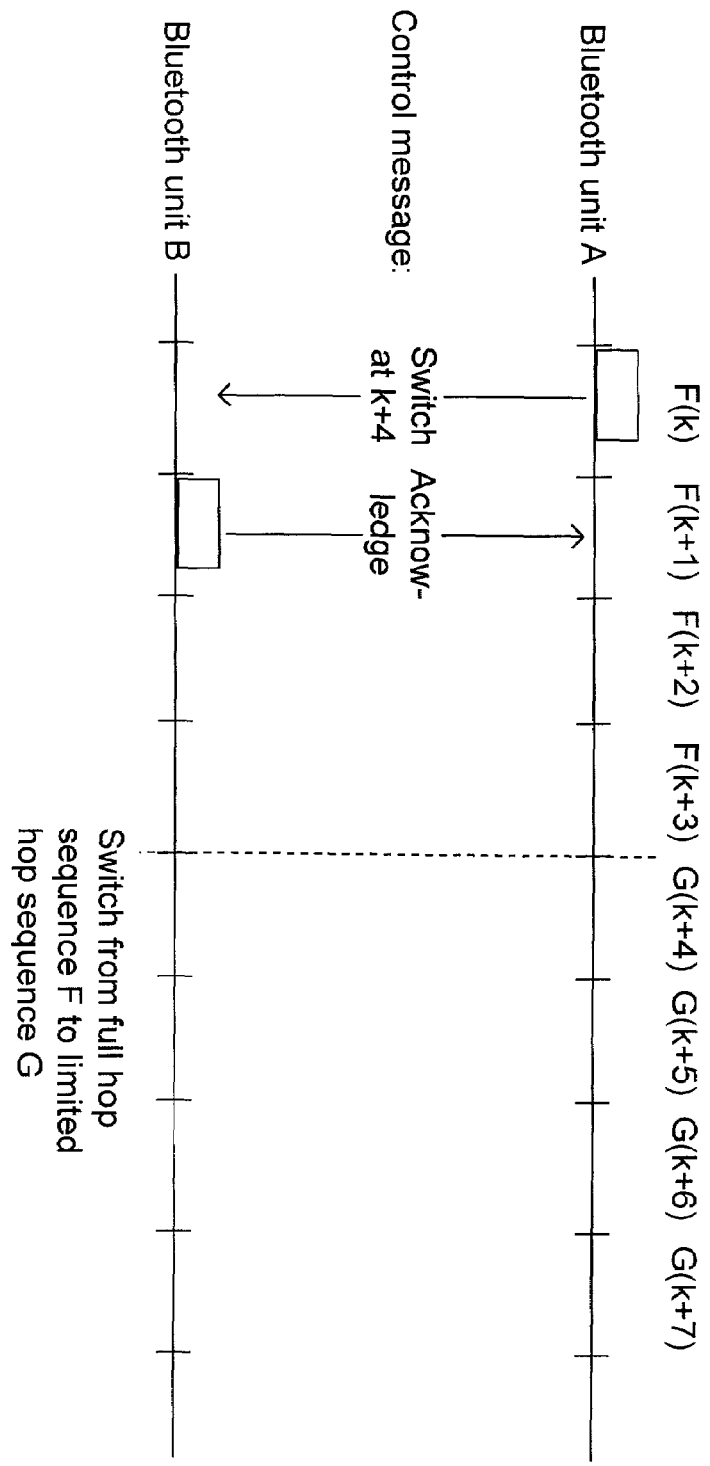
FIG. 5 is a timing diagram illustrating negotiations between two Bluetooth devices switching between the first and second operating modes.

As shown in FIG. 5, a control message will be sent from the first Bluetooth radio transmitter/receiver (Bluetooth radio device 110 in FIG. 1, labeled "Bluetooth unit A" in FIG. 5) to the second Bluetooth radio transmitter/receiver (i.e. the Bluetooth radio of the mobile telephone or handset 130 in FIG. 1, labeled "Bluetooth unit B" in FIG. 5). This control message contains a request from Bluetooth unit A to Bluetooth unit B to switch from a normal 79-hop sequence F (i.e. the first operating mode) to a limited 23-hop sequence G (i.e. the second operating mode). This control message may also contain an indication of the actual phase (or clock value) in the current 79-hop sequence, that the hop switch will occur at. This phase should be several hops into the future in order to allow Bluetooth unit B to confirm the reception of the control message and prepare for the actual switch. For example, in FIG. 5 Bluetooth unit A request that a switch from hop sequence F to hop sequence G shall occur at time k+4. The Bluetooth unit B will acknowledge reception of this control message and start preparing for a switch to the hop sequence G. At time k+4, both Bluetooth units A and B will switch from the full 79-hop sequence F to the limited 23-hop sequence G, i.e. from the first operating mode to the second operating mode. If the Globalstar link 122 is subsequently released, the Bluetooth units A and B will return to the first operating mode. The procedure described above is repeated, however in a reversed order, wherein a switch will be carried out from the limited 23-hop sequence G to the full 79-hop sequence F.

If a Globalstar link 122 currently exists and a Bluetooth link 112 is to be established, the Globalstar link may temporarily be disturbed, since no Bluetooth link exists yet, and since no negotiations have yet taken place, Bluetooth unit B has no knowledge of the existence of the Globalstar link 122 between the satellite terminal 100 and the Globalstar satellite 140. The procedure for establishing the Bluetooth connection 110 between Bluetooth units A and B will therefore use the normal 79-hop sequence. However, as soon as the connection has been established, Bluetooth units A and B may negotiate to enter the second operating mode, using only the limited 23-hop sequence. Consequently, during the set-up and the negotiation procedures, which will only occupy 1–2 seconds, the Bluetooth radio 110, 210 may cause interference with the Globalstar radio 120, 220, when hop carrier frequencies are used in the uppermost portion of the ISM band. However, error-correcting capabilities in the Globalstar system will most likely take care of such short disturbances.

The present invention has been described above with reference to a preferred embodiment. However, other embodiments than the one illustrated are equally possible within the scope of the invention, as defined by the appended patent claims. For instance, depending on the actual requirements for suppression of spurious effects, the hop carrier frequencies constituting the limited hop sequence in the second operating mode may alternatively be located in another portion of the total frequency band than in the lower portion thereof. In particular, if the second radio device has its receive band below the frequency band occupied by the first radio device, the limited hop sequence would preferably use hop carrier frequencies located in the upper portion of the frequency band. Alternatively, the limited hop sequence may be located in the center of the entire frequency band in order to prevent spurious effects both above and below the frequency band. Additionally, the frequency-hopping spread-spectrum band of the first radio device has been referred to above as the 2.45 ISM band. However, other frequency bands are also possible within the scope of the invention.

The dual-radio communication apparatus of the present invention may be implemented by other devices than the satellite terminal 100 shown in FIG. 1. Moreover, the first and second devices of this dual-radio communication apparatus may be of other types than a Bluetooth radio and a Globalstar satellite radio.

Additionally, in FIG. 1, the first and second radio devices 110, 120 are illustrated as physically separate units, which appear to be connected by wires to the satellite terminal 100. However, this illustration has exemplifying purposes only. Any of the first and second radio devices 110, 120 may equally well be integrated with the communication apparatus 100 itself.

What is claimed is:

1. A dual-radio communication apparatus comprising:
   a first radio device for use in a first frequency band;
   a second radio device for use in a second frequency band, proximate to the first frequency band;
   a controller coupled to the first and second radio devices;
   wherein the first radio device has a first operating mode employing a first frequency range, and a second operating mode employing a second frequency range, the second frequency range being smaller than the first frequency range; and
   wherein the controller is adapted to set the first radio device in its second operating mode, when the second radio device is in operation, and otherwise set the first radio device in its first operating mode.

2. The dual-radio communication apparatus as in claim 1, wherein the first radio device comprises a frequency-hopping spread-spectrum transmitter, which uses a first plurality of hop carrier frequencies within said first frequency range in said first operating mode, and which uses a second plurality of hop carrier frequencies within said second frequency range in said second operating mode.

3. The dual-radio communication apparatus as in claim 2, wherein the second plurality of hop carrier frequencies is a subset of the first plurality of hop carrier frequencies.

4. The dual-radio communication apparatus as in claim 3, wherein the first operating mode employs 79 hop carrier frequencies spaced apart by about 1 MHz and starting at about 2.4 GHz, and wherein the second operating mode employs the first 23 of these 79 hop carrier frequencies.

5. The dual-radio communication apparatus as in claim 1 or 2, wherein the first radio device is a Bluetooth radio.

6. The dual-radio communication apparatus as in claim 1, wherein the second radio device is a Globalstar satellite radio.

7. A method of operating a dual-radio communication apparatus comprising:
   a first radio device for use in a first frequency band;
   a second radio device for use in a second frequency band, proximate to the first frequency band, the method comprising the steps of:
   a) determining whether the second radio device is in operation;
   b) for the first radio device, using a first frequency range, if the answer in step a) is in the negative; and
   c) for the first radio device, using a second frequency range, the second frequency range being smaller than the first frequency range, if the answer in step a) is in the affirmative.

8. The method according to claim 7, the first radio device being of frequency-hopping spread-spectrum type, wherein step b) involves the use of a first plurality of hop carrier frequencies, which are distributed over said first frequency range, and wherein step c) involves the use of a second plurality of hop carrier frequencies, which are distributed over said second frequency range.

* * * * *